E. FULDA.
METHOD OF UNITING VERTICAL PLATES BY ELECTRIC WELDING.
APPLICATION FILED JUNE 19, 1918.

1,328,919. Patented Jan. 27, 1920.

INVENTOR
Edward Fulda.
BY
Townsend & Decker
ATTORNEYS

UNITED STATES PATENT OFFICE.

EDWARD FULDA, OF NEW YORK, N. Y.

METHOD OF UNITING VERTICAL PLATES BY ELECTRIC WELDING.

1,328,919.         Specification of Letters Patent.         Patented Jan. 27, 1920.

Application filed June 19, 1918. Serial No. 240,725.

*To all whom it may concern:*

Be it known that I, EDWARD FULDA, a citizen of the United States, and a resident of New York, in the county of New York and State of New York, have invented certain new and useful Improvements in Methods of Uniting Vertical Plates by Electric Welding, of which the following is a specification.

This invention relates to the uniting of metal plates by an electric welding process wherein the electric current and the pressure is localized by means of a button placed on the outside of the plates as described in the United States patent granted to L. S. Lachman on March 26th 1912, No. 1,020,991. The object of the present invention is to permit and make practical the use of the process described in said patent for welding plates when in vertical or approximately vertical position.

The process set forth in the above patent is of great utility in welding heavy plates and for this reason is of supreme importance in the welding of ship plates. However in assembling these plates to form the hull of a ship they are disposed in a vertical position or in a plane approximating the vertical to a greater or less extent. Now when utilizing the above patented process on this class of work or on any work where the plates to be welded are disposed vertically, difficulty and awkwardness as well as delay is experienced due to the proper placing of the welding button and keeping it in place until engaged by the welding dies. According to the present invention the welding button is held in proper position against the vertical plates by means independent of the welding dies and before such dies are brought into operation.

The invention consists in the improved arrangement hereinafter more particularly described and set forth in the appended claims.

Figure 1:
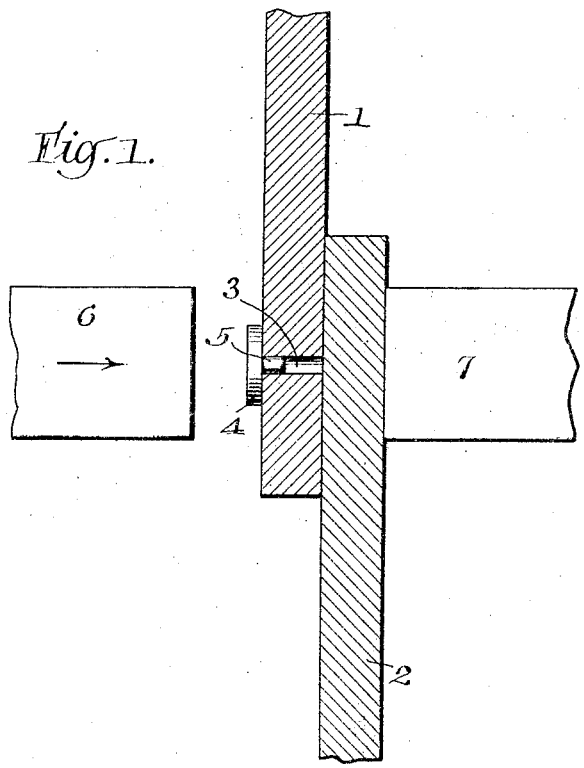

In the accompanying drawings Figure 1 is a vertical section through two superposed plates arranged for welding in accordance with this invention, the welding dies or electrodes being shown diagrammatically.

Figure 2:
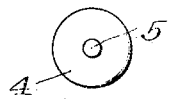
Figure 3:
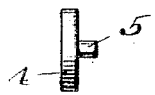

Figs. 2 and 3 are plan view and side elevation respectively of a preferred form of welding button which may be utilized in carrying out this invention.

The plates to be welded, indicated at 1 and 2, are superposed on each other with any desired amount of overlap. In one manner of carrying out my invention the plate 1 is provided with a hole 3 at the place of desired union with the plate 2. The hole 3 may run through from surface to surface of the plate as a perforation or it may be of any suitable shorter depth.

4 indicates a welding button which, as in the case of the above mentioned patent, is placed in initial surface contact with the plate 1 and acts to localize the application of current and pressure as described in the said patent. The button 4 is by preference round as shown but may be of any desired contour. In order to hold the button in the place it is desired to make a weld when the plates are disposed vertically and before the welding dies or electrodes are brought into action, it is, in accordance with one manner of carrying out the invention, provided with a teat or projection 5 which fits snugly in the hole 3. The button is thus applied to the plates and held in surface contact therewith.

The welding of the plates together by means of the button is accomplished in any suitable manner. This part of the process is now well known and universally understood and no detailed description is deemed necessary. In one manner of acomplishing it, oppositely disposed welding dies or electrodes 6 and 7 are brought into line with the button 4 and caused to grip the work therebetween from opposite sides. Electric heating current is passed from one electrode to the other through the work and pressure is applied, the plates 1 and 2 being united together at their meeting surfaces by a spot weld determined by the size of the button 4. Also in the present case very quick heating results owing to the restricted contact of the button with the surface of the plate 1 due to the perforation 3.

It will be understood that the button may be applied to either side of the work or buttons may be applied on both sides and that other modifications of the invention may be resorted to without departing from the scope thereof as set forth in the appended claims.

What I claim as my invention is:

1. The herein described improvement in forming a localized weld between the meeting vertical surfaces of superposed metal plates in vertical position, consisting in providing a heating and pressure localizing piece adapted to be supported on a surface of one of said plates independently of and prior to engagement by the welding dies, locating said piece in contact with the surface of a plate at the place of desired union and passing heating current through said piece and through both plates to effect a welding together of said plates over their engaged surfaces.

2. The herein described improved method of welding superposed metal plates together on their meeting surfaces while arranged in vertical position and by means of a welding current passed through said plates and through a piece in contact with the outer surface of one of them, consisting in providing said piece with means for holding it in position upon a surface of said plates over the desired point of welding independently of and prior to engagement by the welding dies, then gripping the piece and the work between opposed welding dies and passing electric current through the piece and the plates and applying pressure to weld the meeting surfaces of the plates together.

3. The herein described improved method of welding superposed metal plates together on their meeting surfaces while arranged in vertical position and by means of a welding current passed through said plate and through a piece in contact with the outer surface of one of them, consisting in providing said piece with means for holding it in position upon the surface of said plates over the desired point of welding independently of and prior to engagement by the welding dies, then gripping the piece and the work between opposed welding dies and passing electric current through the piece and the plates and applying pressure to weld the meeting surfaces of the plates together and at the same time welding the piece to the work.

4. The herein described method of welding the meeting surfaces of superposed metal plates together while they are arranged in vertical position and by means of a welding piece applied to the exterior surface of said plates, consisting in providing said welding piece with means for holding it to said outer surface independently of and prior to engagement by the welding dies, placing said piece in position over the location of the weld to be formed between the meeting surfaces of said plates and electrically welding said surfaces together by means of welding dies applied to said piece as and for the purpose described.

5. The herein described method of welding superposed metal plates together by their meeting surfaces while said plates are in vertical position and by means of a welding piece applied to the exterior surface of a plate, consisting in providing said piece with a teat or projection whereby it may be held in position over the place of union independently of and prior to engagement by the welding dies, placing said piece in the desired position of union and applying welding dies to said piece and passing heating electric current into the same and over and through the surfaces around said projection in surface contact with the plate and through the meeting surfaces of the plates and applying pressure to weld said meeting surfaces together.

6. The herein described improved method of welding superposed metal plates together at their meeting surfaces while the plates are in vertical position, consisting in providing a welding piece having a teat or projection, providing a hole in the outer surface of one of said plates over the desired location of weld and adapted to receive said teat or projection, applying the piece to the outer surface in initial contact with said outer surface and with the piece supported from said surface, then gripping said piece and plates between welding dies and passing electric current from one die to the other and applying pressure to weld the meeting surfaces together.

7. A welding piece for welding plates together by their meeting surfaces while they are in vertical position, provided with a teat or projection by which it may be held to a surface of the work independently of and prior to operation of the welding dies by which pressure is applied and current passed through the engaging surfaces of the piece and the plates to effect a weld.

8. An electric welding piece for uniting plates of metal while in vertical position by the method described, having a teat or projection adapted to enter the hole in one of the plates to hold the piece thereto prior to the application of the welding dies and passage of welding current through the surfaces of the piece and plates in engagement with one another.

9. The method of welding superposed metal plates in vertical position by means of a welding button placed in contact with the outer surface of the plates, consisting in providing said button with means for holding it in contact with the surface of said plates prior to engagement by the welding dies, then gripping it and the work between opposed welding dies, passing electric current through the button and the plates and applying pressure to complete the weld.

10. The method of welding superposed metal plates in vertical position, consisting in providing a welding button having a teat or projection, applying said button to the plates with its teat or projection in a hole in one of the plates and the surface thereof in initial contact with the surface of the plates, then gripping said plates and button between welding dies, passing electric current from one die to the other and applying pressure to weld the interposed work together.

Signed at New York, in the county of New York and State of New York, this 18th day of June, A. D. 1918.

EDWARD FULDA.

Witnesses:
F. B. TOWNSEND,
F. E. ROESLER.